(12) United States Patent
Graham et al.

(10) Patent No.: US 8,196,031 B2
(45) Date of Patent: Jun. 5, 2012

(54) CONTENT INDEPENDENT DOCUMENT NAVIGATION SYSTEM AND METHOD

(75) Inventors: Brian T. Graham, Seattle, WA (US); Peter W. Davis, Seattle, WA (US)

(73) Assignee: GH, LLC, Lafayette, IN (US)

( * ) Notice: Subject to any disclaimer, the term of this patent is extended or adjusted under 35 U.S.C. 154(b) by 2627 days.

(21) Appl. No.: 10/278,763

(22) Filed: Oct. 21, 2002
(Under 37 CFR 1.47)

(65) Prior Publication Data

US 2003/0212957 A1    Nov. 13, 2003

Related U.S. Application Data

(60) Provisional application No. 60/335,969, filed on Oct. 19, 2001.

(51) Int. Cl.
*G06N 3/00* (2006.01)
(52) U.S. Cl. ..................................... 715/201
(58) Field of Classification Search ............ 715/514, 715/513, 517, 523, 530, 234, 244, 254, 201, 715/243
See application file for complete search history.

(56) References Cited

U.S. PATENT DOCUMENTS

| | | | | |
|---|---|---|---|---|
| 6,377,927 | B1 * | 4/2002 | Loghmani et al. | 704/275 |
| 6,389,467 | B1 * | 5/2002 | Eyal | 709/223 |
| 2002/0116421 | A1 * | 8/2002 | Fox et al. | 707/526 |
| 2002/0156811 | A1 * | 10/2002 | Krupa | 707/513 |
| 2003/0043940 | A1 * | 3/2003 | Janky et al. | 375/345 |

OTHER PUBLICATIONS

"Introduction to HTML—Table of Contents," Sep. 20, 2000, <http://www.utoronta.ca/webdocs/HTMLdocs/NewHTML/htmlindex.html>, pp. 1-3.*
<http://web.archive.org/web/20001018210839/http://www.utoronto.ca/webdocs/HTMLdocs/NewHTML/htmlindex.html> added to the archive Oct. 18, 2000, p. 1-3.*

* cited by examiner

*Primary Examiner* — Kyle Stork
(74) *Attorney, Agent, or Firm* — Taft, Stettinius +Hollister, LLP; Keith J. Swedo, Esq.

(57) ABSTRACT

A system and method for delivering information and enabling navigation and playback of the information that is independent of the content in a document, the system and method using a speech recognition interface that includes a tool for document authoring that associates portions of the content with a node, associates each node with at least one other node, assigns nodes identifying data corresponding to associated content, and provides a user interface to access the content of the document. The user interface can be configured to recognize spoken commands, input from a mouse or keyboard, or input from a DTMF source.

2 Claims, No Drawings

CONTENT INDEPENDENT DOCUMENT NAVIGATION SYSTEM AND METHOD

BACKGROUND OF THE INVENTION

1. Field of the Invention

The present invention pertains to a system and method for delivering information, and more particularly, to a system and method that enables navigation and playback of information using speech recognition interface and computer synthesized or recorded speech responses.

2. Description of the Related Art

Access to information stored in electronic format, including information accessible via the Internet, has facilitated the dissemination of information to a large segment of the population. Electronically-stored information is typically retrieved and viewed using a personal computer that accesses the Internet via a modem or other communication interface, and the retrieved information is displayed on a monitor or electronic screen for visual discernment.

One segment of the population that cannot view information using the conventional display method of a monitor or electronic screen are those with visual impairments. While Braille and other methods of tactile reading of information has worked well in paper medium, this form of communication is not adaptable to computer monitors and electronic screens. While manufacturers have focused on the visual display of information, recent laws have forced companies and government entities to provide information, such as laws, rules, and regulations in a form accessible by those who are visually or otherwise impaired. Consequently, there is a need for a system that permits the visually impaired to communicate with information providers and to have access to information stored or available via electronic means.

BRIEF SUMMARY OF THE INVENTION

The disclosed embodiments of the invention are directed to a method and system for navigating content of a document that is independent of the content. In one embodiment, the method includes the steps of associating portions of the content with a node, associating each node with at least one other node, assigning each node identifying data corresponding to the portions of the content associated with the node, and providing a user interface to access the content of the document via the associated nodes using spoken commands.

In accordance with one aspect of the foregoing embodiment, each node is associated with another node in a parent-child relationship with the last node, ideally a leaf node, containing the content.

In accordance with another aspect of the foregoing embodiment, the identifying data assigned to each node includes one or more of an integer representing the hierarchical order of the node, a unique value identifying the node from all other nodes, a type value indicating the type of content associated with the node, a text string identifying the node within its logical section of the document, and a cross reference to other nodes in the documents. Ideally, the document will include a table of contents, and the identifying data assigned to a node associated with the table of contents will include a text string as an entry in the document's table of contents.

In accordance with another aspect of the foregoing embodiment, the user interface uses voice recognition to enable a user to speak a command that enables browsing of the content, including jumping to content identified in the table of contents. Ideally, the system is configured to utilize DTMF (touch-tone signals via a telephone) for navigation, with and without using voice recognition, as well as using a mouse, a keyboard, or a combination of mouse and keyboard.

In accordance with another embodiment of the invention, a system for navigating content of a document is provided. The system includes means for associating portions of the content with a unique node, means for associating each node with at least one other node, means for assigning each node identifying data corresponding to portions of the content associated with the node, and a user interface to access the content of the document via the associated nodes using spoken commands.

In accordance with an aspect of the foregoing embodiment, the means for associating each node with at least one other node includes providing a parent-child relationship between nodes.

In accordance with another aspect of the foregoing embodiment, the means for assigning each node identifying data is configured to include one or more of the following data, a positive integer identifying the node in a hierarchical order of the nodes, a unique value identifying the node from all other nodes, a node type identifying the type of content associated with the node, a text string identifying the node within its logical section of the document, and a cross reference of the node to other nodes.

In accordance with another aspect of the foregoing embodiment, the content includes a table of contents, and nodes are associated with the table of contents such that a command spoken via the user interface enables a user to jump to content identified in the table of contents.

In accordance with another aspect of the present invention, the document is structured, well-formed, and valid so that it can be easily navigated by a user with a CIDNav or similar system. In one embodiment, the document uses XML-based (including VoiceXML) elements, HTML-based elements, and SGML-based elements and attributes tailored specifically to be navigable by a CIDNav or similar system.

In accordance with a further aspect of the present invention, document authoring tools are provided for the development of documents that are structured, well-formed, and valid so that the document can be easily navigated by a user using the system of the present invention. In accordance with one aspect of this embodiment of the invention, a tool for automatic document authoring is provided that is comprised of applications that convert various input sources (Microsoft Word, Adobe Acrobat, ASCII Text, HTML, and other similar document formats) into a structured and formatted document suitable for use with CIDNav or a similar system formed in accordance with the present invention. Alternatively, the tool can provide for manual document authoring of the afore-said applications to assist a user in converting various input sources into the structured and formatted document that can then be converted using the above document authoring tools into a document suitable for use with a CIDNav or similar system.

DETAILED DESCRIPTION OF THE INVENTION

Overview

Content independent navigation of information (CIDNav) is an application playback and navigation of a document using a speech recognition interface and computer synthesized or recorded voice responses. Documents are divided into hierarchical structure that allows easy and intuitive navigation by voice. The CIDNav system of the present invention is designed to deliver information by speech over the telephone, both wireline and wireless, and VOIP, in analog and digital format. A table of contents representing the hierarchical structure is also provided.

In addition to the CIDNav application, the documents themselves and the tools for making them will be discussed. The documents are structured and formatted text files that use a markup language (XML-, SGML-, or HTML-based) to organize the document data to be easily navigable using CIDNav. As a specific case the xHTML DTD (Document Type Definition) is used when authoring xHTML documents for use with CIDNav.

The tool for document authoring is composed of applications that convert various input sources (Microsoft Word, Adobe Acrobat, ASCII Text, HTML, and other similar document formats) into a structured and formatted document suitable for use with CIDNav. This process involves two stages. First, the software algorithm automatically converts various visual format items into structured element tags with attributes, forming a well-formed fragment. Second, the fragment is appended with header and footer information to comprise a well-formed and valid XML (including VoiceXML and all other XML derivatives), SGML, or HTML document. This document can then be navigated and stored using CIDNav.

Document Representation

Document Hierarchy

Most documents that are written by humans can be represented in a hierarchical "tree" structure. A tree consists of "nodes," and has exactly one "top level" node. Nodes may contain an unlimited number of other nodes, or "children," and a node that contains other nodes is known as a "parent." A node that does not contain any other nodes is known as a "leaf node." Each child has an "index" within its parent, and therefore there is the "first" child, the "second" child (if any), and so on until the "last" child.

When representing a document as a tree, the "top level node" is the document itself, and each logical section of the document is contained as a child node. Each child node contains further divisions and child nodes, and so on, until each part of the document is represented as a node in the tree. The leaf nodes of the tree contain the actual text of the document.

A good example of this structure is a common novel. The top level node is the book itself. Direct children of the top node are the preface and each chapter. Each of those child nodes contains paragraphs, and each paragraph contains sentences. In the interest of a simple user interface, sentences are generally the most atomic node in a document represented in CIDNav; however, the tree could easily be extended further to include phrases and words as separate nodes in the tree.

CIDNav does not limit itself to relatively simple documents like novels. The "types" of nodes that may be represented are defined in the document itself, and may include common types such as articles, sections, subsections, tables, rows, columns, footnotes, and any other types specific to any given document.

XML Format

XML lends itself easily to representing this type of tree structure. Therefore the native document "format" that CIDNav is capable of reading is a subset of XML.

Nodes

A node in the tree may be associated with several pieces of data. The types of data and functions that evaluate to the value of that data for a node N are specified be- low. Most data is optional; only the data specified as "required" will never evaluate to undefined.

parent(N): the parent node of N. It is implied that there is some positive integer index i such that N=child(parent(N), i). All nodes except the single top level node will have a parent.

child(N, i): the $i^{th}$ child of N, where i is a positive integer. It is implied that N=parent(child(N, i)) for any node N and positive integer i. Any node may have any number of children. There must be no positive integer i such that child (N, i) is undefined and child(N, i+1) is defined. Also, the text of the content (child(N, i)) must be located physically before the content (child(N, i+1)) for any node N and any of N's children in the document.

id(N): a unique value identifying a node from all other nodes. All nodes are required to have a unique ID.

type(N): the type of a node; for example, "paragraph," "chapter," "section," or "sentence." It is implied that type(N) ≠type(parent(N))≠type(parent(parent(N))). . . for any parent or parent of a parent of N, except in the case that type(N) is undefined. This means that while any type may occur at any depth into the tree, a node of a given type may not contain as a child, directly or indirectly, another node of the same type. This eases both the skills required to navigate the document and the definitions of document navigation functions.

The set of possible types is dependent on the document. A node is not required to have a type; however, it is highly recommended that any nodes with a description or content have a type so that they may be identified by the user.

The top level node in the tree never has a type. Formally, if parent(N) is undefined, then type(N) is also undefined.

name(N): a text string identifying the node within its logical section of the document. For example, in a document that identifies sections with letters, the name of the node representing Section B would be "B." In order to facilitate voice recognition and Text to Speech systems, the name should not include abbreviations and should be spelled phonetically when pronunciation is questionable.

A node who's logical identifier is a number will not have a name. For example, in a document that identifies sections with numbers, the node representing Section 2 will not have a name, and will instead be referenced simply by the fact that it is the second node of type "section" within its parent.

content(N): a text string containing the actual document text that this node represents. This text should be written in a way that facilitates reproduction by a Text to Speech system: abbreviations should be fully expanded, and words from foreign languages or words with questionable pronunciations should be spelled phonetically.

description(N): a text string to be included as an entry in the document's table of contents. This is usually a human-readable phrase describing the node, its children, and its type and identification, whatever that may be. For example, a table of contents entry for a node that represents a chapter in a novel might be, "Chapter 1: A Dark and Stormy Night." The top level node in the document tree must have a description representing the document's title.

crossReference(N, i): the $i^{th}$ cross reference of the node N, where i is a positive integer. It is implied that crossReference (N, i)=id(M) for some other node M in the document and some positive integer i. There must be no positive integer i such that crossReference(N, i) is undefined and crossReference(N, i+1). For example, if a node N has content that refers to (in human language) the content represented by node M in some other part of the document, then N may hold a cross reference to M. The user may then access that cross reference with a simple voice command. N may have any number of cross references; in the case that N has more than one, the user will be presented with a list and allowed to choose his or her desired destination.

Basic Tree Navigation

Although the document is represented internally as a tree, to the user it is generally viewed in a linear fashion. The most basic commands to control playback of the document are therefore "forward" and "reverse."

Siblings

Expanding on the metaphor of a node having children and a parent, a node N may also have siblings. That is, nodes that have the same parent and represent parts of the document that come before or after N.

Given a positive integer i such that child(parent(N), i)=N:
Next Sibling: nextSibling(N)=child(parent(N), i+1).
Previous Sibling: previousSibling(N)=child(parent(N), i−1).

Note that nextSibling(N) and previousSibling(N) will be undefined if i=1 or if i is equal to the number of children belonging to parent(N).

Forward

Given any node N, the next node next(N) is defined as the "returned value" of the following algorithm:

(1) If child(N, 1) is defined (that is, if N has any children), then return child(N, 1).
(2) Let P ← parent(N). If P is undefined, then next(N) is undefined.
(3) Let S ← nextSibling(N). If S is defined, then return S.
(4) Otherwise, set N ← P, P ← parent(P), and go to step 2.

Reverse

Given any node N, the previous node previous(N) is defined as the "returned value" of the following algorithm:

(1) Let P ← parent(N). If P is undefined, then previous(N) is undefined.
(2) Let π ← previousSibling(N). If π is undefined, then return P.
(3) Let N ← child(π, j), where j is the greatest positive integer such that child(N, j) is defined. If there is no such positive integer, then return Tr.
(4) Otherwise, set π ← N and go to step 3.

User Interface

The functions next(N) and previous(N) do not map directly to voice commands. They are instead used as part of other functions that may be accessed by the user.

Document Navigation

Document navigation applies when the user is actually reading the document. Therefore, functions related to document navigation will only return a node N for which content (N) is defined.

Most commands may include a numeric argument, known as the "count" and represented by the variable z, and an argument that restricts the function to operate on or search for only a specific type of node, known as the "type" and represented by t. The count z is always greater than or equal to 1; if z is not given as a part of the command, then it is implicitly set to 1.

The following commands may be spoken by the user while reading the document:

Forward

The user may optionally give a count z and type t: for example, "forward two paragraphs."

Given any node N, the next "content node" nextContent(N, z, t) is defined as follows:

(1) Set N ← next(N)
(2) It t is undefined, of if type(N)=t, then let c ← content(N) and go to step 5.
(3) Set N ← next(N).
(4) If N is undefined, then nextContent(N, z, t) is undefined for the original values of N and z.
(5) If c is defined, then set z ← z−1. Otherwise, go to step 7.
(6) if z=0, then return N. Otherwise, go to step 1.
(7) Set N ← next(N).
(8) If N is undefined, then nextContent(N, z, t) is undefined for the original values of N and z. Otherwise, set c ← content (N) and go to step 5.

Since the function nextContent(N, z, t) is commonly used without z and t as part of other functions, to ease notation, nextContent(N) is defined as nextContent(N, 1, undefined).

Reverse

The user may optionally give a count z and type t: for example, "backward two paragraphs."

Given any node N, the previous "content node" previousContent(N, z, t) is defined as follows:

(1) If t is undefined, then go to step 10.
(2) Let P ← N.
(3) If type(P)=t, then set P ← parent(P). Otherwise, set N ← P and go to step 5.
(4) If P is defined, then go to step 3.
(5) Set N ← previous(N). If N is undefined, the n previousContent(N, z, t) is undefined for the original values of N and z.
(6) If type(N)≠t, then go to step 5.
(7) Set N ← nextContent(N).
(8) If N is undefined, then previousContent(N, z, t) is undefined for the original values of N and z. Otherwise, set z ← z−1.
(9) If z=0, then return N. Otherwise, go to step 2.
(10) Set N ← previous(N). If N is undefined, the previousContent(N, z, t) is undefined for the original values of N and z.
(11) Set c ← content(N). If c is undefined, go to step 10. Otherwise, size z ← z−1.
(12) If z≠0, then go to step 1. Otherwise, return N.

Steps 3 and 4 are necessary because the function previous (N) will return the parent of N before it returns that parent's previous sibling. Without these steps, requesting, for example, the "previous paragraph," when N is a node of type "sentence" contained within another node of type "paragraph," would in fact return the containing paragraph rather than the paragraph prior to the containing paragraph, as would be expected.

This algorithm can account for the possibility that nextContent(N) (for the current value of N) may actually occur at or after the original value of N. It can be modified so that, at the beginning, a variable is created to store content(N) ∥ nextContent(N). If the value of N after step 7 is equal to that variable, then reset N to the value after step 6 and go back to step 2.

Jump by Type

It is extremely desirable that the user be able to jump directly to another section of the document without having to find his or her way there with only back and forward commands. A common way to do this is to identify a part of the document by its type and numeric or textual name. For example, a user may wish to jump to "Section 2" or "Subsection F." This identification system can be applied to any type of node; for example, a user may request to jump to "paragraph 3, sentence 1," even though paragraphs and sentences are not normally included in the table of contents and would not be accessible using only Jump by ID.

The current version can also support requesting more than one type/id phrase per jump command. In other words, "Jump to Section 1, subsection B? is allowed as well. Also CIDNav can support not including a node in the counting.

A Jump by Type command may include an arbitrary number of identifiers, limited only by the speech recognition engine. An identifier is composed of a type name t, such as "section," and a name m, such as "2" or "F." The command is processed in sequential order; that is, a request for "paragraph 3, sentence 1" would first search for paragraph 3 and then, using the result of the first search, search for sentence 1. Each type and name is referenced with a positive integer n, indicating the index of that type and name in the spoken command. Thus, "paragraph 3, sentence 1" has $t_1$=paragraph, $m_1$=3, $t_2$=sentence, $m_2$=1, for n=1 and n=2.

Because a document is often divided into logical sections, there will most likely be more than one node that would be, to a human, referred to as, for example, "paragraph 3." Therefore, each search for tn and mn is performed relative to a node N. The search is performed in three phases: first children, parents, and then a bidirectional linear search.

Before the function jumpContent(N, t, m) can be defined, a function to search for a direct child of a node with a name m must be defined. The function findChild(N, t, m) is defined as the following algorithm:
(1) Set N child(N, 1).
(2) If m is a positive integer (that is, its text value contains only the characters "0" through "9" and is not equal to "0"), then go to step 6.
(3) If N is undefined, then findChild(N, t, m) is undefined for the original value of N.
(4) If type(N)=t and name(N)=m, then return N.
(5) Set N ← nextSibling(N) and go to step 3.
(6) Let n ← 0.
(7) If N is undefined, then findChild(N, t, m) is undefined for the original value of N.
(8) If type(N)≠t, then go to step 10.
(9) Set n≠n−1. If n=m, then return N.
(10) Set N ← nextSibling(N) and go to step 7.

The function jumpContent(N, t, m) can now be defined as the following algorithm:
(1) Let P ← N.
(2) Let C ← findChild(P, t, m). If C is defined, then set N ← C and go to step 14.
(3) Set P ← child(P, 1). If P is defined, then go to step 2.
(4) Set P ← parent(N).
(5) If P is undefined, then go to step 8.
(6) Set C ← findChild(P, t, m). If C is defined, then set N ← C and go to step 14.
(7) Go to step 4.
(8) Set P ← previous(N).1
(9) If N is undefined, go to step 11.
(10) Set C ← findChild(N, t, m). If C is defined, then set N ← C and go to step 14. Otherwise, set N ← next(N).
(11) If P is undefined, go to step 13.
(12) Set C ← findChild(P, t, m). If C is defined, then set N ← C and go to step 14. Otherwise, set P ← previous(P) and go to step 9.
(13) If N is also undefined, then jumpContent(N, t, m) is undefined for the original value of N. Otherwise, go to step 9.
(14) Let c ← content(N).
(15) If c is defined, then return N. Otherwise, return nextContent(N).

The bidirectional search algorithm (used as a last resort) can be slightly inefficient in that it is likely to examine nodes already examined in previous steps (that is, "first born" children and parents of the current node). The algorithm could be optimized to skip nodes that have already been tested.

Jump by ID

CIDNav provides a method in which a node may be assigned a phrase or phrases that may be spoken by the user as part of a jump command so that the user may ask for a node by a name other than its type and numerical index or name. For example, the "Introduction" to a document might be represented as the first node of type "section," but it is desirable for the user to be able to say, "Jump to the Introduction."

The method in which these phrases are generated and matched will vary between different versions of CIDNav depending on the capabilities of the speech recognition engine in use. Most current recognition technology works well when only a small number of possible phrases are allowed to be matched, and thus it is not usually possible to automatically generate a list of phrases identifying a node from its description, as will be desirable once recognition quality improves.

Using the "Introduction" example, suppose the node D representing the "Introduction" has id(D)=I. Given a node N, the goal of the function findContent(N, I) is to locate and return the node D. Since the destination of a jump command is often "near" the node N in the document, CIDNav uses a bidirectional search to locate D. The function findContent(N, I) is defined as the following algorithm:
(1) Let P ← previous(N).
(2) If N is undefined, go to step 4. Otherwise, if id(N)=I, then go to step 7.
(3) Set N ← next(N).
(4) If P is undefined, go to step 6. Otherwise, if id(P)=I, then set N ← P go to step 7.
(5) Set P ← previous(P) and go to step 2.
(6) If N is also undefined, then findContent(N, I) is undefined for the original value of N. Otherwise, go to step 2.
(7) Let c ← content(N).
(8) If c is defined, then return N. Otherwise, return nextContent(N).

Repeat

The user can ask to repeat a node or any node that is a parent of that node. This is achieved by asking to simply "repeat" a node N, or by also giving a type t, such as the command "repeat section." The repeat command does not accept a count argument. Thus, the function repeatContent(N, t) is defined as the following algorithm:
(1) If t is undefined, then let c ← content(N) and go to step 5.
(2) If type(N)=t, then let c ← content(N) and go to step 5.
(3) Set N ← parent(N).
(4) If N is undefined, then repeatContent(N, t) is undefined for the original value of N. Otherwise, go to step 2.
(5) If c is defined, then return N. Otherwise, return nextContent(N).

The node returned by repeatContent(N, t) is played to the user, if it is defined. Thus, the command "repeat" with no arguments will repeat N or the first node following N that has content, if N itself does not have content; and, for example, the command "repeat section" will repeat the parent of N with type "section," if any, again searching for a node with content.

Reading the Document

When the user is reading the document, there is always a "current node" N, that is, the node with content that is currently being read. When the end of a nodes content is reached, and no navigation command has been input, the current node is updated to the value of nextContent(N) so that the next node of any type that has content will be played. If the user gives a navigation command activating any of the functions defined in this section, then the current node is updated to the return value of that function.

Note, however, that the current node is never set to be undefined. In the case that the current node would otherwise be set to undefined because the returned value of a navigation function was undefined, then the current node is unmodified and the user is notified that the requested navigation function has failed. Reading of the document will then resume at the current node, except in the case that the end of the document has been reached, in which case the user is asked for input as to the next course of action.

Table of Contents

The table of contents allows the user to examine the structure and overall content of a document and to quickly select an interesting node without necessarily knowing any of the node's identifiers (and therefore without using a "Jump" command). It represents a "collapsed" view of the document tree in which only nodes that have a description (with one exception) are represented. The top level node is not included, since the description of the top level node represents the document's title.

When the table of contents is first visited by the user, he or she will hear a list of the "highest level" nodes, and is allowed to choose the one that he or she wishes to read. Upon selecting a node, the user will be presented with another list of that node's children. The user may then again choose another node from the list and will again hear a list of that node's children, and so on, until a node has no children that have descriptions, at which point he or she will begin reading the document content, beginning at the last selected node. As an alternative, the user may ask to begin reading the document starting at any chosen node immediately, rather than going through the potentially tedious process of selecting a child node multiple times.

As stated earlier, each list of a node's children represents a "collapsed" view of that part of the tree, and includes only those nodes that have descriptions (with one exception). It is not necessary for all of the parents of a node to have descriptions in order for that node to itself be included a list; if a node's parent or parents do not have a description, then that node will be represented as a child of the first parent that does have a description. Note that because the top level node always has a description, it is always possible for this to occur. A node with a description that has no parents with descriptions other than the top level node will be represented as a child of the top level node.

The only time any node that does not have a description is represented in the table of contents is if there is a child of a selected node that has content that is located in the document prior to the first child node that has a description. Such a node is given a default description, giving the user the option of selecting that node to begin reading immediately. This exception is necessary because of the following example: Suppose the user selects "Section 1," and that "Section 1" has a child with a description known as "Subsection A." Suppose also that before "Subsection A" there is a paragraph containing an introduction to "Section 1" that does not have a description. Without this exception, it would be impossible to choose that paragraph from the table of contents, as "Subsection A" would be the first item in the list.

Navigation of the table of contents is similar to navigation of the document, except that no navigation functions, except for the "Jump" functions, accept a type argument. This is because the table of contents, as seen by the user, is somewhat abstracted from the need to navigate using a node's type, and representing these types would only complicate the interface.

Choose

Since the children of a node in the table of contents are not necessarily child(N, i), the function firstTOCChild(N), which is used as part of other functions in this subsection and other subsections, is defined to search for the first child or child of a child that has a description in the following algorithm:

(1) Let $P \leftarrow N$.
(2) Let $S \leftarrow$ nextSibling(P). If S is defined, then go to step 4.
(3) Set $P \leftarrow$ parent(P). If P is defined, then go to step 2.
(4) Set $N \leftarrow$ child(N, 1).
(5) If N is undefined, or if S is defined and N=S, then firstTOCChild(N) is undefined for the original value of N.
(6) If description(N) is defined, then return N. Otherwise, set $N \leftarrow$ next(N) and go to step 5.

When the user chooses a node N in the list, the function chooseTOC(N) is performed. Note that this function does not necessarily return a value modifying the "current node" in the way that other navigation functions do; in addition to possibly returning a value, it may modify the "current document node" D and signal that the document be read starting at D.

The function chooseTOC(N) is defined as the following algorithm:

(1) If description(N) is not defined, then set $D \leftarrow N$ and begin reading the document, starting at node D.
(2) Let $C \leftarrow$ firstTOCChild(N). If C is undefined, then set $D \leftarrow N$ and begin reading the document, starting at node D.
(3) Let $T \leftarrow$ child(N, 1).
(4) If C=T, then return C.
(5) Otherwise, if content(T) is defined, then return T.
(6) Set $T \leftarrow$ next(T) and go to step 4.

This is the exception to the rule as described earlier, where T is a child that has content that comes before any children that have a description. It will be given a default description.

Begin

The command to begin reading immediately sets the current document node to be the current table of contents node and begins reading the document, starting from that node.

Forward

Unlike nextContent(N, z, t) or next(N), nextTOC(N, z) returns the next sibling of N as represented in the "collapsed" table of contents tree.

The user may optionally give a count z, which is a positive integer: for example, "forward 2." If no count is given, z is assumed to be 1.

The function nextTOC(N, L, z) is defined as the following algorithm:

(1) Let $L \leftarrow$ parent(N).
(2) If L is defined and description(L) is undefined, set $L \leftarrow$ parent(L) and repeat step 2.
(3) If description(N) is undefined, then let $C \leftarrow$ firstTOCChild(N). If C is defined, then return C.
(4) If L is undefined, then let S be undefined and go to step 7. Otherwise, let $P \leftarrow L$.
(5) Let $S \leftarrow$ nextSibling(P). If S is defined, then go to step 7.
(6) Let $P \leftarrow$ parent(P). If P is undefined, then S remains undefined and go to step 5.
(7) Set $N \leftarrow$ nextSibling(N).
(8) If N is undefined, or if S is defined and N=S, then nextTOC(N, L, z) is undefined for the original values of N, z.
(9) If description(N) is defined, then set $z \leftarrow z-1$. If z=0, then return N. Otherwise, go to step 4.
(10) Set $N \leftarrow$ next(N) and go to step 8.

Reverse

Moving in reverse has to functions. First, it is to work as the inverse of moving forward; that is, in most cases, previousTOC(nextTOC(N, 1), 1)=N when nextTOC(N, 1) is defined. The exception is when N is a node that does not have a description; in this case, previousTOC(nextTOC(N, 1), 1)=P, where P is the first parent of N that has a description, if any. This is also the second function: if a node N has no previous sibling when represented in the "collapsed" table of contents tree, then previousTOC(N) will return that node's parent in the table of contents tree, which is the first parent of N that has a description, if any. The user may optionally give a count z, which is a positive integer: for example, "reverse 2." If no count is given, z is assumed to be 1.

The function previousTOC(N, z) is defined as the following algorithm:

(1) Let P ← parent(N).
(2) If P is defined and description(P) is undefined, set P ← parent(P) and repeat step 2.
(3) Set N ← previousSibling(N).
(4) If P is defined and N=P, then go to step COUNT&RETURN.
If N is undefined, then Up Moving "up" in the table of contents tree will return to whatever node was the current node at the time of the last choose command. Note that this is identical to the function of the reverse command when the current node N does not have a previous sibling as represented in the table of contents tree.

The function upTOC(N) is defined as follows:
(1) Let P ← parent(N).
(2) If P is defined and description(P) is undefined, set P ← parent(P) and repeat step 2.
(3) Return P (whether or not P is defined).

Jump

The "Jump by Type" and "Jump by ID" commands, when spoken while reading the table of contents, are identical jumpContent(N, t, m) and findContent(N, I). If either of those functions are evaluated and do not return undefined, then CIDNav will immediately begin reading the document at the node returned by the function.

Other Commands

Other navigational commands can be easily incorporated into the CIDNav system, including the "Next" and "Previous" commands. When combined with the various element tags typically associated with documents this list of commands includes such items as next and previous book, chapter, section, sentence, word, and letter; back and forward n units of book, chapter, section, sentence, word, and letter; jump to n instance of book, chapter, section, sentence, word, and letter; and other combinations of standard navigational commands and elements that are obvious to one reasonably skilled in the art.

Cross References

Cross references allow the user to jump to another part of the document when that part's content is referenced by the content of another node. This is especially useful when reading legal documents, or any other such document that often refers to text in another section.

Notification

Given the current node N, when crossReference(N, I) is defined, then the user is notified that a cross reference or cross references are available. This may be by means of an "earcon," or a beep or other short sound, that the user is able to recognize as meaning that a cross reference is available, or through some other auditory means.

It is desirable that the user does not have to respond immediately to a notification of a cross reference. Therefore, a history of all nodes that have or had cross reference(s) available is maintained by CIDNav. Each time crossReference(N, 1) is defined for the current node N, N is added to a list.

After hearing the predefined "earcon," the user may wish to ask, "Where will it take me?" The user will then be informed the location of each cross reference for the node N that was last added to the list of nodes with available cross references.

Activation

Multiple Cross References

It is also permitted using CIDNav to have multiple cross references to allow multiple destinations stemming from a single element. In this case a parameter must be passed to indicate the desired destination. For example, a literary reference in an academic paper may have 3 separate references for one sentence, in which case the user could indicate the desire to "jump to footnote 3".

History

Every time the user gives a command that causes the location at which the document is being read to change by a significant amount, the node at the original location is added to a stack that keeps track of each such jump. The user may then ask to 'Jump back" in order to return to the location in the document prior to the jump. After 'Jumping back", the user may also ask to 'Jump forward" in order to return to the location prior to 'Jumping back".

The stack allows nodes to be pushed, popped, and unpopped. Each time a jump command is input, the current node is pushed onto the stack and the top of the stack is set to be the newly pushed node. Each time the user says "jump back", a node is popped off the stack, but the actual top of the stack remains unmodified. Each time the user says 'Jump forward", a previously popped node is unpopped from the stack, until the actual top of the stack is reached.

It is possible using CIDNav to report the current stack state; that is, the number of items on the stack and the order in which they are currently stored. It is also possible using CIDNav to place a new item on the top of the stack for future processing, to remove the top item from the stack for use in immediate processing, and to replace the most recently popped item back on the stack for storage.

User Actions

The following actions and commands will cause modification of the history stack:

Any "jump" command, be it a "jump by type" or a "jump by ID." The jump command may be issued while reading the document or from the table of contents.

Selecting a node to be read from the table of contents. Simply choosing a node does not modify the history; the act of choosing the node must cause the current location in the document to change.

Jumping as a result of activating a cross reference.

Issuing a forward or reverse command with either a count argument that is greater than 2 or a type argument.

Issuing a repeat command with a type argument that is not equal to the type of the current node.

If any of the above action are unsuccessful, then the history stack will be unmodified. For example, a command would fail if the user asks to jump to a node that does not exist, or if the user asks to "go forward 3 paragraphs" when there are no more paragraphs remaining in the document.

Locations and "Status Reports"

Because the user has no visual feedback of his or her current location in the document, the user is constantly given auditory information acknowledging each command and regarding the destination of each significant change in location. Current speech recognition technology is also susceptible to errors; constant feedback allows the user to detect any misrecognitions and to ask to "jump back" immediately in case of an error.

The user is given the option to control how much of this feedback is received; more feedback makes it less likely that the user will get "lost" in the document, but receiving less feedback will increase the speed at which the document can be navigated. Various levels of feedback are present in the program, and the user may restrict "higher" levels from being played:

(1) Every command given by the user, whether or not it causes a change of location in the document or causes an action to be performed, is acknowledged with an "earcon." This allows the user to verify that his or her command was in fact received at all; users that speak quietly or users accessing CIDNav from a noisy environment might otherwise be unaware if their command was not understood by the speech recognition engine.

(2) Commands that cause some action to be performed, whether or not they cause a change of location in the document, are additionally acknowledged by a voice response. For example, if the user says "begin reading" while listening to an entry in the table of contents, then CIDNav will respond with, "I will now begin reading."

(3) Any command that causes a significant change of the current location in the document is additionally acknowledged by reading the "location" of the new node. An algorithm to find the textual "location" of a node is given below. Commands that cause this level of feedback are the same as those that cause the node history stack to be updated.

The user may also ask explicitly to hear the location of the current node by saying, for example, "Where am I?" The user may also ask to hear the location of whatever node was last pushed onto the history stack by saying, for example, "Where was I?"

Location Strings

When reading the textual location of a node N, it is not enough to simply read description(N), or if that is not available, to read type(N) and name(N). Because documents are organized into a tree structure, and because the description or type of a node usually is dependant on other nodes in the same logical section of the document, reading the location of a node also involves reading the descriptions or names of each of that node's parents.

A node's textual location may also be computed relative to some other node. This allows the time required for adequate feedback regarding a change of the location in the document to be reduced. For example, if a user is currently located at "Chapter 2, Section 5, Paragraph 3" and asks to move to the next section, then CIDNav might respond with, "I will now take you forward to 'Section 6'," as opposed to, "I will now take you forward to 'Chapter 2, Section 6'." For small or simple documents, the difference might not be significant, but for complex documents in which nodes are many levels deep, the timed saved can be very large.

When the user asks for the location of a node, it is read as a text string. For example, if the user is reading a document about the mating habits of South African mosquitoes, the command "Where was I?" might cause CIDNav to respond with, "You are at Chapter 2, Section 5: 'Mating Dances', Paragraph 3, Sentence 1." In this way, information about both the structure of the document and the most relevant node description is provided.

First, a function designed to retrieve the name of an individual node, which could be either numerical or the result of name(N), must be defined. The function locationID(N) is defined as the following algorithm:
(1) Let d ← name(N). If d is defined, then return d.
(2) Let P ← parent(N).
(3) Let C ← child(P, 1), c ← 0.
(4) If type(C)=type(N), then set c ← c+1.
(5) If C=N, then return c.
(6) Set C ← nextSibling(C) and go to step 4.

When locationID(N) is evaluated as part of location(N), parent(N) will always be defined.

Next, the function to actually formulate a text string that represents the node's location in human-readable form must be defined. In order to facilitate needs to play the final string in both pre-recorded audio and synthesized speech, each element of the string is separated as $L_1, L_2, \ldots, L_n$, where n is the number of elements in the string.

The algorithm that follows contains four parts:
(1) Build an array $P_n$ of the parents of the node N; $P_1$=N, $P_2$=parent(N), and so on. At the same time, find the first parent of N that has a description: let d be the smallest value of n such that description($P_n$) is defined, if there is any such value.
(2) Build an array $R_n$ of the parents of the node M; $R_1$=M, $R_2$=parent(M), and so on.
(3) Find the common nodes at the end of R and P in order to find the first parent that is not shared by N and M. That is, if n is the number of elements in P and m is the number of elements in R, then find the smallest positive integer i such that $P_{n-i} \neq R_{m-i}$. If there is no such integer (that is, if P=R), the i ← 1.
(4) Starting with $P_i$ and working backwards until i=1, being assembling $L_1, L_2, \ldots, L_{i'}$ (where i' is the original value of i).

formally, location(N, M) is defined as the following algorithm:
(1) Let n ← 1, T ← N, d ← 0.
(2) Let Pn ← T. If d=0, then set d ← n.
(3) Set T ← parent(T). If T is defined, then set n ← n+1 and go to step 2.
(4) If M is undefined, then let m ← 0 and go to step 7.
(5) Let m ← 1, T ← M.
(6) Let Rm ← T. Set T ← parent(T). If T is defined, then set m ← m+1 and repeat step 6.
(7) If m=0, then go to step 10.
(8) If Pn=Rm, then set n ← n−1, m ← m−1. Otherwise, go to step 10.
(9) If n≠0, then go to step 7. Otherwise, set n ← 1.
(10) Let j ← 1.
(11) Let t ← type(Pn). If t is undefined, then set n ← n−1. If n=0, then go to step 15. Otherwise, repeat step 11. (Note that t is always undefined for the top level node in the document. Therefore, a location string never includes the top level node unless that is the only node that would otherwise be included.)
(12) Let Lj ← t, Lj+1 locationID(Pn) and set j ← j+2.
(13) If n=d, then let Lj ← description(Pd) and set j ← j+2.
(14) Set n ← n−1. If n ≠0, then go to step 11.
(15) If j≠1, then return L.
(16) If parent(N) is undefined, then let L1=description(N) and return L.
(17) If M is defined, then set Rm to be undefined for all positive integers m, set M ← parent(M), and go to step 1.
(18) Set N ← parent(N). If parent(N) is undefined, set $L_1$=description(N) and return L. Otherwise, repeat step 18.

Step 16, 17, and 18 handle the special cases in which there were no nodes suitable of inclusion in the location string. First, if N is the top level node in the tree, then set the sole element of the location string to be the description of N (which is the document title). The second line of defense is to begin stripping down M and R to possibly find a node in P suitable for inclusion that was not originally suitable simply because it was a common parent between P and R. The last resort is to find the top level node in the tree and set the sole element of the location string to be the description of that node (which, again, is the document title). In this way, location(N, M) is never undefined for any node N.

Once L has been computed, each element $L_2, L_2, \ldots, L_{j-1}$ is read to the user using either some method of mapping the element to a live recording or using a computer synthesized voice.

Document Structure

In addition to the CIDNav application, the documents themselves must be prepared according to certain unique specifications. The documents are structured and formatted text files that use a markup language (XML-, SGML-, or HTML-based) to organize the document data to be easily navigable using CIDNav. As a specific case the xHTML DTD (Document Type Definition) is used when authoring xHTML documents for use with CIDNav.

Tools for authoring CIDNav-compatible Documents

In addition to the CIDNav application, the documents authoring tools for making them are important to developing the complete and functional system. These tools can be divided into two major categories: the tool for automatic conversion of existing documents into the CIDNav-compatible documents, and the tool for manual conversion of existing documents into the CIDNav-compatible documents.

The tool for automatic document authoring is composed of applications that convert various input sources (Microsoft Word, Adobe Acrobat, ASCII Text, HTML, and other similar document formats) into a structured and formatted document suitable for use with CIDNav. This process involves two stages. First, the software algorithm automatically converts various visual format items into structured element tags with attributes, forming a well-formed fragment. Second, the fragment is appended with header and footer information to comprise a well-formed and valid XML (including VoiceXML and all other XML derivatives), SGML, or HTML document. This document can then be navigated and stored using CIDNav.

The tool for manual document authoring is composed of applications that assist the user in the visual markup and formatting of various input sources (Microsoft Word, Adobe Acrobat, ASCII Text, HTML, and other similar document formats) so that they can then be passed through the above automated process and subsequently converted into a structured and formatted document suitable for use with CIDNav. This process involves two stages. First, the software algorithm automatically converts various visual format items into structured element tags with attributes, forming a well-formed fragment. Second, the fragment is appended with header and footer information to comprise a well-formed and valid XML (including VoiceXML and all other XML derivatives), SGML, or HTML document. This document can then be navigated and stored using CIDNav.

From the foregoing it will be appreciated that, although specific embodiments of the invention have been described herein for purposes of illustration, various modifications may be made without deviating from the spirit and scope of the invention. Accordingly, the invention is not limited except as by the appended claims and the equivalents thereof.

The invention claimed is:

1. A system, comprising a processor, for navigating the content of a document, the system comprising:
   means for associating portions of the content with a node;
   means for associating each node with at least one other node;
   means for assigning each node identifying data corresponding to portions of the text associated with the node; and
   a user interface to provide access to the content of the document via the associated nodes using spoken commands with references to the identifying data and without reference to the portions of the text associated with the nodes, wherein the user interface is configured to:
   provide auditory feedback to a user to confirm a given command prior to executing the command; and
   enable a user to control how much of the feedback is received.

2. A method of navigating the content of a document, comprising:
   associating portions of the content with a node;
   associating each node with at least one other node;
   assigning each node identifying data corresponding to the portion of the content associated with the node; and
   providing a user interface to access the content of the document using spoken commands without reference to text within the content, wherein when an end of a node's content is reached, and no navigation command has been input, the next node that has content is played.

* * * * *